(12) United States Patent
Sengoku

(10) Patent No.: US 9,178,690 B2
(45) Date of Patent: Nov. 3, 2015

(54) N FACTORIAL DUAL DATA RATE CLOCK AND DATA RECOVERY

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/252,450

(22) Filed: Apr. 14, 2014

(65) Prior Publication Data

US 2015/0098536 A1 Apr. 9, 2015

Related U.S. Application Data

(60) Provisional application No. 61/886,567, filed on Oct. 3, 2013.

(51) Int. Cl.
| H04L 7/00 | (2006.01) |
| H04L 7/033 | (2006.01) |
| H04L 5/00 | (2006.01) |
| H04L 25/14 | (2006.01) |
| H04L 25/49 | (2006.01) |

(52) U.S. Cl.
CPC ............ *H04L 7/0337* (2013.01); *H04L 5/0053* (2013.01); *H04L 7/0087* (2013.01); *H04L 7/033* (2013.01); *H04L 25/14* (2013.01); *H04L 25/49* (2013.01); *H04L 7/0012* (2013.01)

(58) Field of Classification Search
CPC .................................................. H04L 7/0012
USPC ........................................................ 375/355
See application file for complete search history.

(56) References Cited

U.S. PATENT DOCUMENTS 5,959,568 A * 9/1999 Woolley ........................... 342/42
6,836,522 B1 12/2004 Wakayama
(Continued)

FOREIGN PATENT DOCUMENTS

DE 102004013093 B3 7/2005
EP 1385306 A1 1/2004
(Continued)

OTHER PUBLICATIONS

Vitesse, "VSC7226 Quad 3.125Gb/s Backplane Transceiver," VITESSE Semiconductor Corporation, PB-VSC7226-002, 2002, 2 Pages.
(Continued)

*Primary Examiner* — Santiago Garcia
(74) *Attorney, Agent, or Firm* — Loza & Loza, LLP

(57) ABSTRACT

System, methods and apparatus are described that facilitate transmission of data over a multi-wire data communications link, particularly between two devices within an electronic apparatus. Each symbol in a sequence of symbols received from a plurality of signal wires is received in an odd transmission interval or an even transmission interval. A first clock signal is generated from transitions in signaling state of the wires occurring between each odd transmission interval and a consecutive even transmission interval. A second clock signal is generated from transitions in signaling state of the plurality of wires occurring between each even transmission interval and a consecutive odd transmission interval. The first and second clock signals are used to capture symbols received in even and odd transmission intervals, respectively.

31 Claims, 12 Drawing Sheets

(56) References Cited

U.S. PATENT DOCUMENTS

| | | |
|---|---|---|
| 7,167,527 B1 * | 1/2007 | Park et al. .................... 375/295 |
| 7,715,509 B2 | 5/2010 | Stojanovic et al. |
| 8,649,460 B2 | 2/2014 | Ware et al. |
| 8,659,957 B2 | 2/2014 | Sekine |
| 2006/0132335 A1 | 6/2006 | Kojima |
| 2007/0073932 A1 * | 3/2007 | Pike et al. ...................... 710/58 |
| 2008/0159432 A1 | 7/2008 | Ng |
| 2008/0165732 A1 * | 7/2008 | Kim et al. .................... 370/329 |
| 2010/0111207 A1 * | 5/2010 | Suda et al. .................... 375/260 |
| 2014/0254732 A1 | 9/2014 | Sengoku et al. |
| 2014/0254733 A1 | 9/2014 | Sengoku et al. |
| 2014/0286466 A1 | 9/2014 | Sengoku et al. |

FOREIGN PATENT DOCUMENTS

| | | |
|---|---|---|
| WO | WO-2008151251 A1 | 12/2008 |
| WO | WO-2009086078 A1 | 7/2009 |

OTHER PUBLICATIONS

International Search Report and Written Opinion—PCT/US2014/058609—ISA/EPO—Dec. 16, 2014.

* cited by examiner

N FACTORIAL DUAL DATA RATE CLOCK AND DATA RECOVERY

CLAIM OF PRIORITY UNDER 35 U.S.C. §119

The present application for patent claims priority to Provisional Application No. 61/886,567 entitled "N Factorial Clock And Data Recovery With Negative Hold Time Sampling" filed Oct. 3, 2013, which is assigned to the assignee hereof, which applications are hereby expressly incorporated by reference herein.

BACKGROUND

1. Field

The present disclosure relates generally to an interface between a host processor and a peripheral device such as a camera and, more particularly, to improving clock generation for double data rate data transfer on an N-wire communication interface.

2. Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DSI) standard specified by the Mobile Industry Processor Interface Alliance (MIPI).

In one example, a multi-signal data transfer system may employ multi-wire differential signaling such as 3-phase or N-factorial (N!) low-voltage differential signaling (LVDS), transcoding (e.g., the digital-to-digital data conversion of one encoding type to another) may be performed to embed symbol clock information by causing a symbol transition at every symbol cycle, instead of sending clock information in separate data lanes (differential transmission paths). Embedding clock information by transcoding is an effective way to minimize skew between clock and data signals, as well as to eliminate the necessity of a phase-locked loop (PLL) to recover the clock information from the data signals.

The capabilities and functionality of mobile devices continues to grow and there is a resultant demand for ever-increasing bandwidth between components within mobile devices and the like. Accordingly, there exists an ongoing need for optimized communications in general and improved reliability of data transfer on multi-signal wire communication links.

SUMMARY

Embodiments disclosed herein provide systems, methods and apparatus related to multi-wire interfaces. The systems, methods and apparatus relate to the use of receiver circuits that can extract reliable clock signals for recovery of data transmitted using double data rate clocking.

In an aspect of the disclosure, a method of data communications includes receiving a sequence of symbols from a plurality of signal wires, each symbol in the sequence of symbols being received during one of an odd transmission interval or an even transmission interval, generating a first clock signal from transitions in signaling state of the plurality of wires occurring between each odd transmission interval and a consecutive even transmission interval, generating a second clock signal from transitions in signaling state of the plurality of wires occurring between each even transmission interval and a consecutive odd transmission interval, using the first clock signal to capture a first set of symbols including symbols in the sequence of symbols that are received in even transmission intervals, and using the second clock signal to capture a second set of symbols including symbols in the sequence of symbols that are received in odd transmission intervals.

In an aspect of the disclosure, each odd transmission interval is immediately preceded by a first even transmission interval and immediately succeeded by a second even transmission interval.

In an aspect of the disclosure, each pair of consecutive symbols received in the sequence of symbols includes one symbol received during in an odd transmission interval and one symbol received during an even transmission interval.

In an aspect of the disclosure, timing of a first edge in the first clock signal is based on a first transition that occurs between a first symbol and a second symbol that is received immediately after the first symbol. Timing of a first edge in the second clock signal may be based on a second transition that occurs between the second symbol and a third symbol that is received immediately after the second symbol.

In an aspect of the disclosure, timing of a second edge in the first clock signal is based on the timing of the first edge in the second clock signal Timing of a second edge in the second clock signal may be based on timing of a third edge in the first clock signal, where the timing of the third edge in the first clock signal is based on a third transition that occurs between the third symbol and a fourth symbol that is received immediately after the third symbol.

In an aspect of the disclosure, generating the first clock signal includes ignoring the second transition. Generating the second clock signal may include ignoring the first transition.

In an aspect of the disclosure, each pair of consecutive symbols in the sequence of symbols includes two symbols that are associated with different signaling states on the plurality of signal wires.

In an aspect of the disclosure, receiving the sequence of symbols from the plurality of signal wires includes receiving differential signals from all possible combinations of two signal wires in the plurality of signal wires. Each symbol in the sequence of symbols may be encoded in a combination of signaling states of the differential signals.

In an aspect of the disclosure, receiving the sequence of symbols from the plurality of signal wires includes receiving a 3-phase signal from each of three signal wires, where each of the three signal wires is in a different signaling state with respect to the other signal wires in each transmission interval. Each symbol in the sequence of symbols may be encoded in a combination of signaling states of the three signal wires.

In an aspect of the disclosure, an apparatus includes means for receiving a sequence of symbols from a plurality of signal wires, where each symbol in the sequence of symbols is received during one of an odd transmission interval or an even transmission interval, means for generating a first clock signal from transitions in signaling state of the plurality of signal wires occurring between each odd transmission interval and a consecutive even transmission interval, means for generating a second clock signal from transitions in signaling state of the plurality of signal wires occurring between each even transmission interval and a consecutive odd transmission interval, means for using the first clock signal to capture a first set of symbols including symbols in the sequence of symbols that are received in even transmission intervals, and means for using the second clock signal to capture a second set of symbols including symbols in the sequence of symbols that are received in odd transmission intervals.

In an aspect of the disclosure, a receiver includes a plurality of line interface circuits configured to receive signals from a plurality of signal wires, and a CDR circuit. The CDR circuit may be configured to receive a sequence of symbols from the plurality of signal wires, where each symbol in the sequence of symbols is received during one of an odd transmission interval or an even transmission interval, generate a first clock signal from transitions in signaling state of the plurality of signal wires occurring between each odd transmission interval and a consecutive even transmission interval, generate a second clock signal from transitions in signaling state of the plurality of signal wires occurring between each even transmission interval and a consecutive odd transmission interval, use the first clock signal to capture a first set of symbols including symbols in the sequence of symbols that are received in even transmission intervals, and use the second clock signal to capture a second set of symbols including symbols in the sequence of symbols that are received in odd transmission intervals.

In an aspect of the disclosure, a processor-readable storage medium has one or more instructions stored thereon. The instructions may be executed by at least one processing circuit. The instructions may cause the at least one processing circuit to receive a sequence of symbols from a plurality of signal wires, where each symbol in the sequence of symbols is received during one of an odd transmission interval or an even transmission interval, generate a first clock signal from transitions in signaling state of the plurality of signal wires occurring between each odd transmission interval and a consecutive even transmission interval, generate a second clock signal from transitions in signaling state of the plurality of signal wires occurring between each even transmission interval and a consecutive odd transmission interval, use the first clock signal to capture a first set of symbols including symbols in the sequence of symbols that are received in even transmission intervals, and use the second clock signal to capture a second set of symbols including symbols in the sequence of symbols that are received in odd transmission intervals.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similar functioning device.

Figure 1:
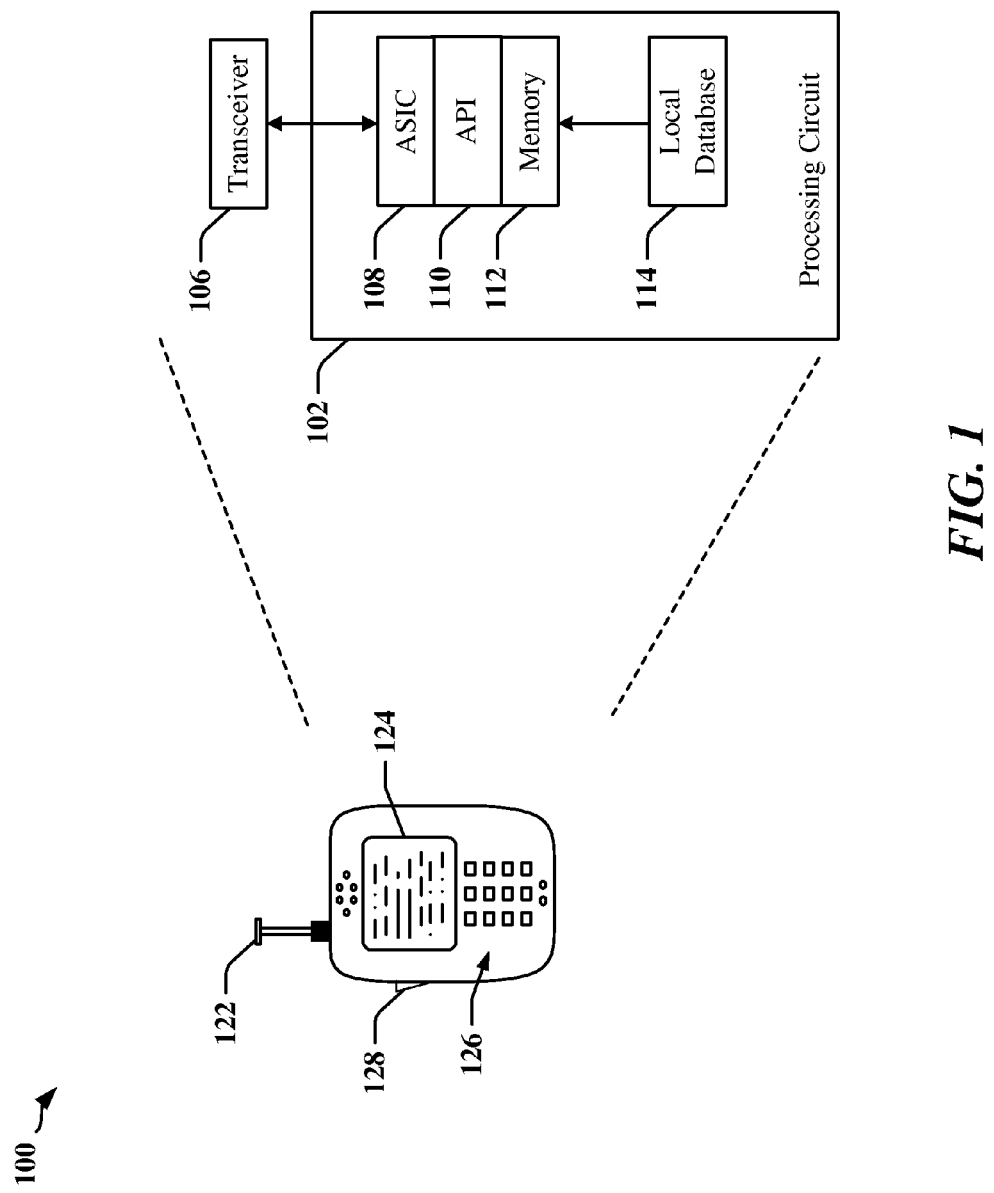
FIG. 1 depicts an apparatus employing a data link between integrated circuit (IC) devices that selectively operates according to one of plurality of available standards.

FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108.

The ASIC 108 may include one or more processing devices, logic circuits, and so on. The processing circuit 102 may include and/or be coupled to processor readable storage such as a memory 112 that can maintain data and instructions that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as button 128 and keypad 126 among other components.

Figure 2:
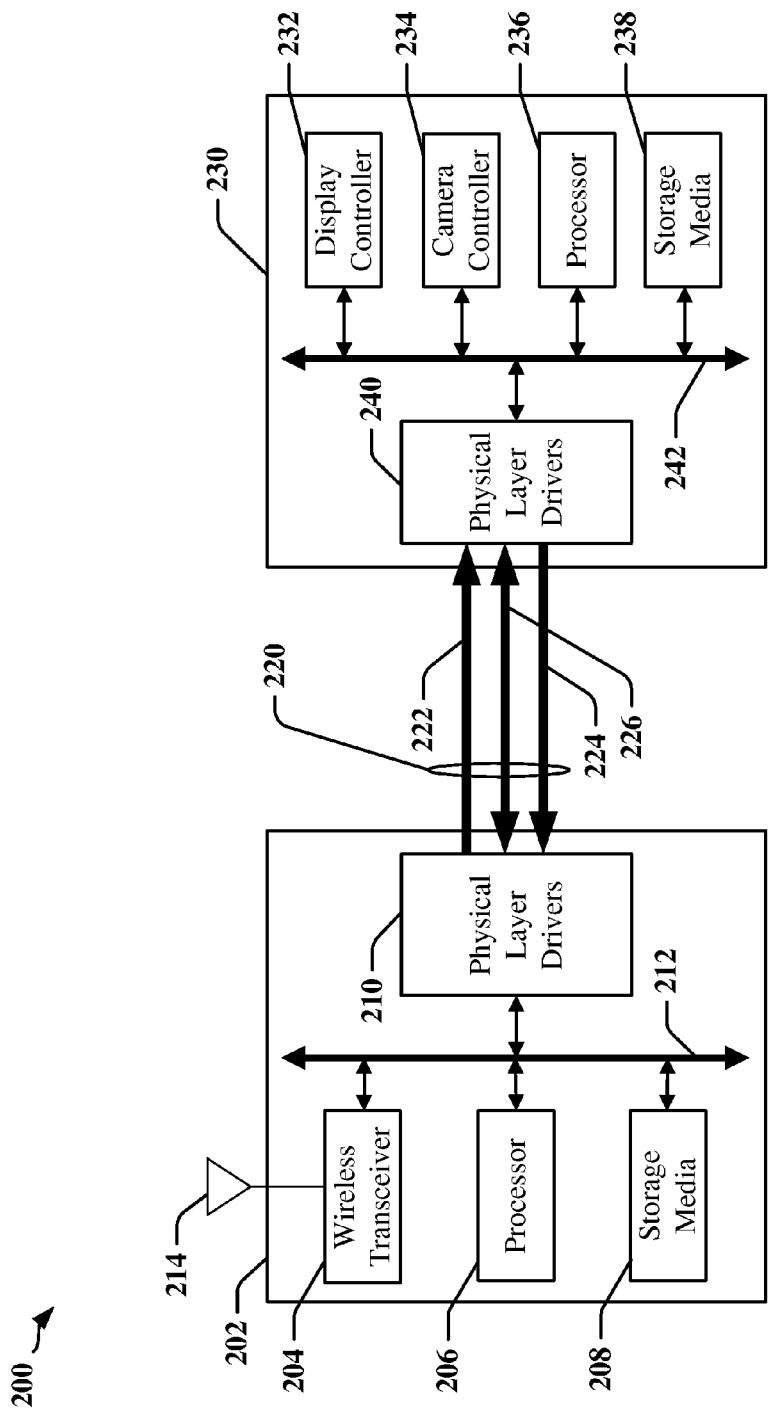
FIG. 2 illustrates a system architecture for an apparatus employing a data link between IC devices.

FIG. 2 is a block schematic illustrating certain aspects of an apparatus 200 such as a mobile apparatus that employs a communication link 220 to connect various subcomponents. In one example, the apparatus 200 includes a plurality of IC devices 202 and 230 that exchange data and control information through a communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward link/channel 222 while a second communications channel 224 may be referred to as a reverse link/channel 224. The first IC device 202 may be designated as a host system or transmitter, while the second IC device 230 may be designated as a client system or receiver, even if both IC devices 202 and 230 are configured to transmit and receive on the forward communications link/channel 222. In one example, the forward link 222 may operate at a higher data rate when communicating data from a first IC device 202 to a second IC device 230, while the reverse link/channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

In one example, forward and reverse links 222 and 224 may be configured or adapted to support a wide video graphics array (WVGA) 80 frames per second LCD driver IC without a frame buffer, delivering pixel data at 810 Mbps for display refresh. In another example, forward and reverse links 222 and 224 may be configured or adapted to enable communications between with dynamic random access memory (DRAM), such as double data rate synchronous dynamic random access memory (SDRAM). Encoding devices 210 and/or 230 can encode multiple bits per clock transition, and multiple sets of wires can be used to transmit and receive data from the SDRAM, control signals, address signals, and so on.

The forward and reverse links 222 and 224 may comply with, or be compatible with application-specific industry standards. In one example, the MIPI standard defines physical layer interfaces between an application processor IC device 202 and an IC device 230 that supports the camera or display in a mobile device. The MIPI standard includes specifications that govern the operational characteristics of products that comply with MIPI specifications for mobile devices. The MIPI standard may define interfaces that employ complimentary metal-oxide-semiconductor (CMOS) parallel busses.

The communication link 220 of FIG. 2 may be implemented as a wired bus that includes a plurality of signal wires (denoted as N wires). The N wires may be configured to carry data encoded in symbols, where clock information is embedded in a sequence of the symbols transmitted over the plurality of wires. Examples of encoding techniques used with N-wire interfaces include N-factorial (N!) encoding, and N-phase encoding.

Figure 3:
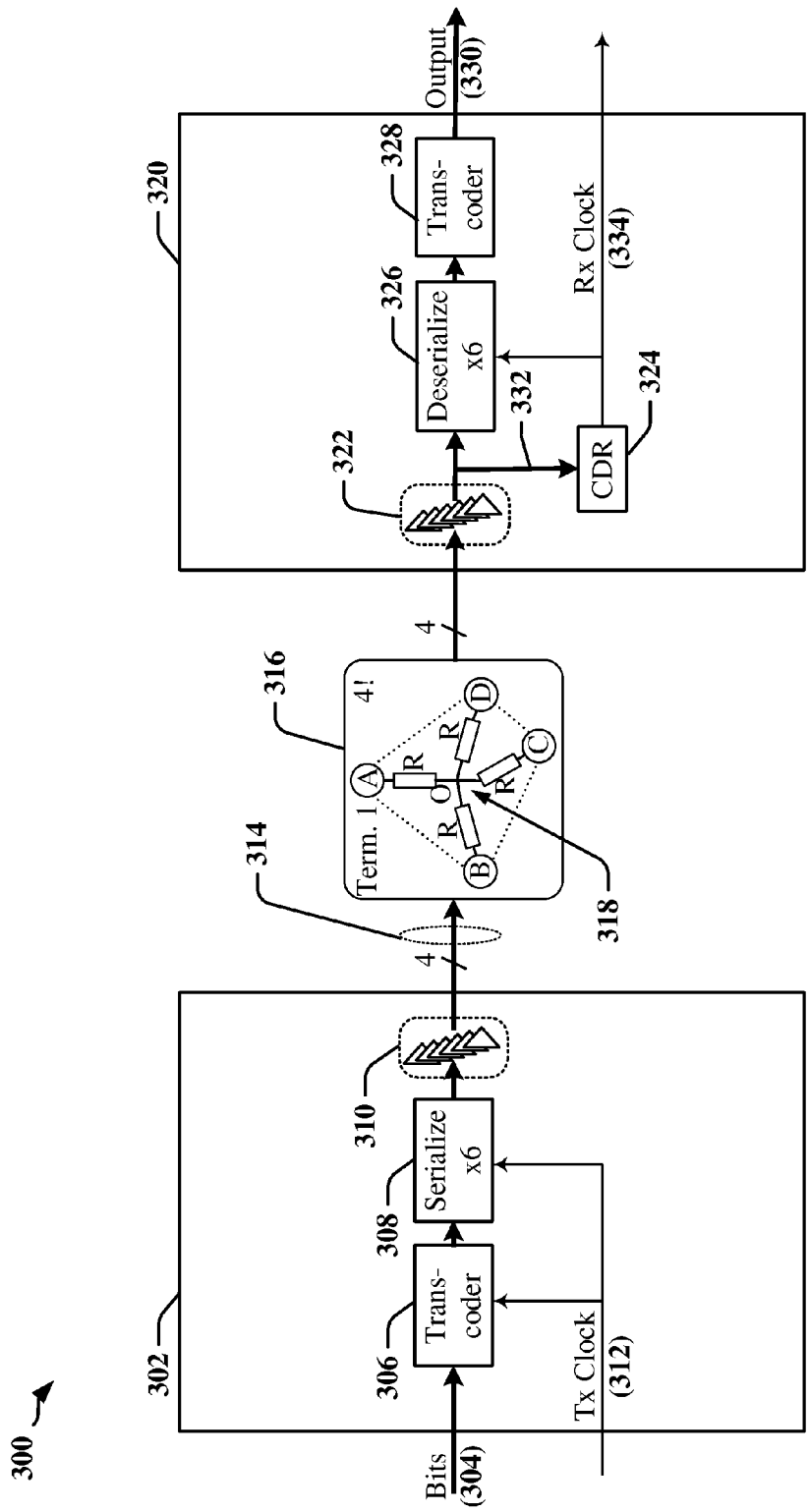
FIG. 3 illustrates an example of a basic N! multi-wire interface.

FIG. 3 is a diagram illustrating an example of N! encoding used on an N-wire interface 300 provided between two devices 302 and 320. At a transmitter 302, a transcoder 306 may be used to encode data 304 and clock information in symbols to be transmitted over a set of N wires 314. The clock information may be derived from a transmit clock 312 and may be encoded in a sequence of symbols transmitted in $_NC_2$ differential signals over the N wires 314 by ensuring that a signaling state transition occurs on at least one of the $_NC_2$ signals between consecutive symbols. When N! encoding is used to drive the N wires 314, each bit of a symbol is transmitted as a differential signal by one of a set of differential line drivers 310, where the differential drivers in the set of line drivers 310 are coupled to different pairs of the N wires. The number of available combinations of wire pairs ($_NC_2$) determines the number of signals that can be transmitted over the N wires 314. The number of data bits 304 that can be encoded in a symbol may be calculated based on the number of available signaling states available for each symbol transmission interval.

A termination impedance (typically resistive) couples each of the N wires 314 to a common center point 318 in a termination network 316. It will be appreciated that the signaling state of the N wires 314 reflects a combination of the currents in the termination network 316 attributed to the differential drivers 310 coupled to each wire. It will be further appreciated that the center point 318 is a null point, whereby the currents in the termination network 316 cancel each other at the center point.

The N! encoding scheme need not use a separate clock channel and/or non-return-to-zero decoding because at least one of the $_NC_2$ signals in the link transitions between consecutive symbols. Effectively, each transcoder 306 ensures that a transition occurs between each pair of symbols transmitted on the N wires 314 by producing a sequence of symbols in which each symbol is different from its immediate predecessor symbol. In the example depicted in FIG. 3, four wires are provided (N=4), and the 4 wires can carry $_4C_2=6$ differential signals. The transcoder 306 may employ a mapping scheme to generate raw symbols for transmission on the N wires 314. The transcoder 306 may map data bits 304 to a set of transition numbers. The transition numbers may be used to select raw symbols for transmission based on the value of the immediately preceding symbol such that the selected raw symbol is different from the preceding raw symbol. The raw symbols may be serialized by the serializer 308 to obtain a sequence of symbols for transmission over the N-wires 314. In one example, a transition number may be used to lookup a data value corresponding to the second of the consecutive raw symbols with reference to the first of the consecutive raw symbols. At the receiver 320, a transcoder 328 may employ a mapping to determine a transition number that characterizes a difference between a pair of consecutive raw symbols in a lookup table, for example. The transcoders 306, 328 operate on the basis that every consecutive pair of raw symbols includes two different symbols.

The transcoder 306 at the transmitter 302 may select between N!−1 available signaling states at every symbol transition. In one example, a 4! system provides 4!−1=23 signaling states for the next symbol to be transmitted at each symbol transition. The bit rate may be calculated as $\log_2$(available_states) per transmit clock cycle.

According to certain aspects disclosed herein, dual data rate (DDR) signaling may be employed to increase the interface bandwidth by transmitting two symbols in each period of the transmit clock 312. Symbol transitions occur at both the rising edge and falling edge of the transmit clock in a system using double data rate (DDR) clocking. The total available states in the transmit clock cycle is $(_NC_2-1)^2=(23)^2=529$ and the number of data bits 304 that can transmitted per symbol may be calculated as $\log_2(529)=9.047$ bits.

A receiving device 320 receives the sequence of symbols using a set of line receivers 322 where each receiver in the set of line receivers 322 determines differences in signaling states on one pair of the N wires 314. Accordingly, $_NC_2$ receivers are used, where N represents the number of wires. The $_NC_2$ receivers 322 produce a corresponding number of raw symbols as outputs. In the depicted 4-wire example, the signals received on the 4 wires 314 are processed by 6 receivers ($_4C_2$=6) to produce a raw symbol signal 332 that is provided to a CDR 324 and deserializer 326. The raw symbol signal 332 is representative of the signaling state of the N wires 314, and the CDR 324 may process the raw symbol signal 332 to generate a receive clock signal 334 that can be used by the deserializer 326.

The receive clock signal 334 may be a DDR clock signal that can be used by external circuitry to process received data 330 provided by the transcoder 328. The transcoder 328 decodes a block of received symbols from the deserializer 326 by comparing each symbol to its immediate predecessor. The transcoder 328 produces output data 330 corresponding to the data 304, provided to the transmitter 302.

Figure 4:
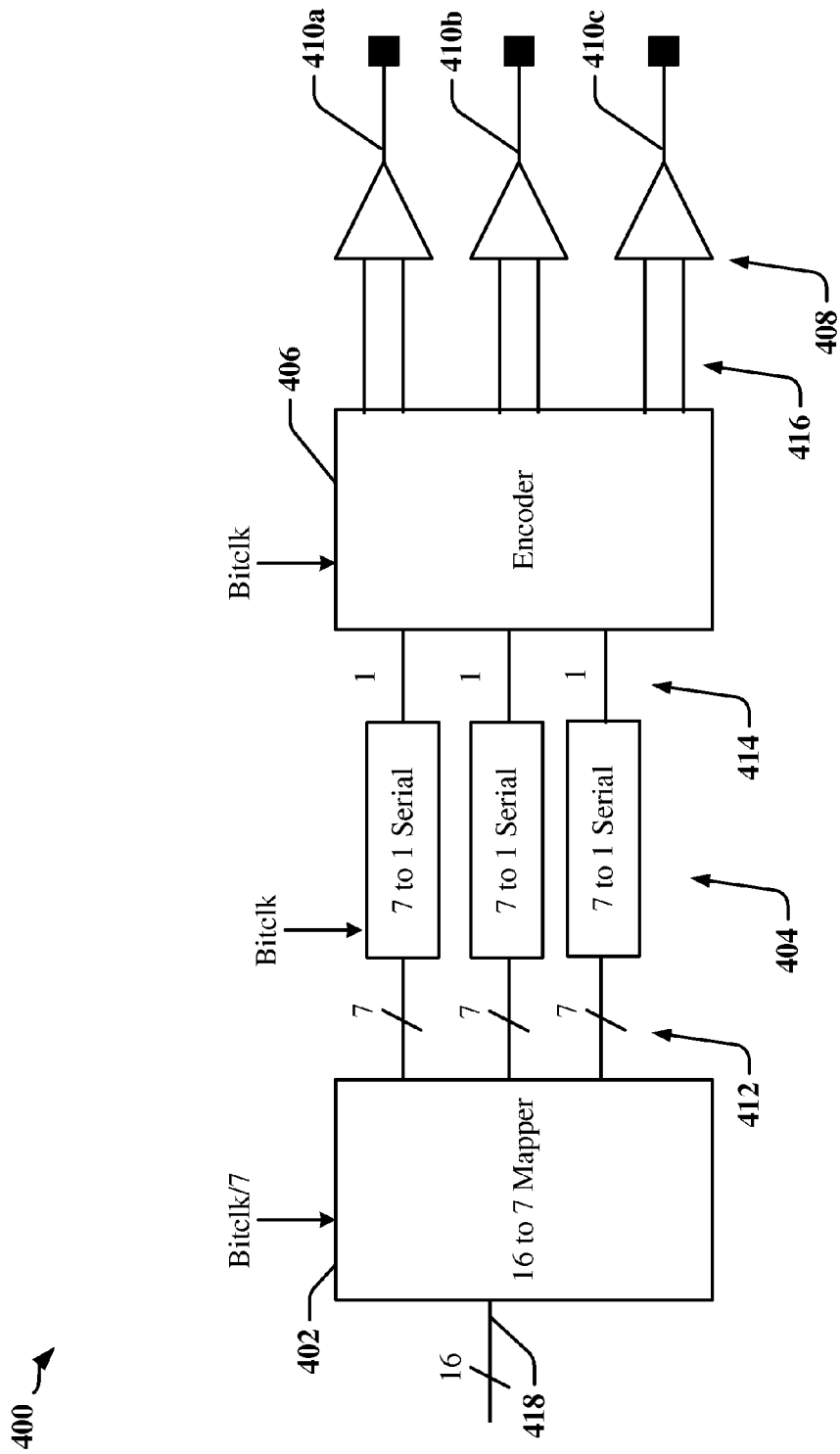
FIG. 4 illustrates an example of an N-phase polarity data encoder.

Certain other multi-wire interfaces use N-phase encoding to transmit data over a plurality of wires. FIG. 4 is a diagram 400 illustrating an example of an M-wire, N-phase polarity encoding transmitter configured for M=3 and N=3. The principles and techniques disclosed for 3-wire, 3-phase encoders can be applied in other configurations of M-wire, N-phase polarity encoders.

When N-phase polarity encoding is used, connectors such as signal wires 410a, 410b and 410c on an M-wire bus may be undriven, driven positive, or driven negative. An undriven signal wire 410a, 410b or 410c may be in a high-impedance state. An undriven signal wire 410a, 410b or 410c may be at least partially pulled or driven towards a voltage level that lies substantially halfway between the positive and negative voltage levels provided on driven signal wires. An undriven signal wire 410a, 410b or 410c may have no current flowing through it. In the example illustrated in FIG. 4, a set of drivers 408 may control the state of each signal wire 410a, 410b and 410c for each symbol transmission interval, such that each signal wire 410a, 410b and 410c may be in one of three states (denoted as +1, −1, and 0) for a transmitted symbol. In one example, drivers 408 may include unit-level current-mode drivers. In another example, drivers 408 may drive opposite polarity voltages on two signals 410a and 410b while the third signal 410c is at high impedance and/or pulled to ground. For each symbol transmission interval, at least one signal is in the undriven (0) state, while the number of signals driven positive (+1 state) is equal to the number of signals driven negative (−1 state), such that the sum of current flowing to the receiver is always zero. For each pair of consecutive symbol transmission intervals, at least one signal wire 410a, 410b or 410c has a different state in the two symbol transmission intervals.

In the example depicted in FIG. 4, 16-bit data 418 is input to a mapper 402, which maps the input data 418 to 7 symbols 412 for transmitting sequentially over the signal wires 410a, 410b and 410c. The 7 symbols 412 may be serialized, using parallel-to-serial converters 404 for example. A 3-wire, 3-phase encoder 406 receives 7 symbols 412 produced by the mapper one symbol at a time and computes the state of each signal wire 410a, 410b and 410c for each symbol interval. The encoder 406 selects the states of the signal wires 410a, 410b and 410c based on the input symbol and the previous states of signal wires 410a, 410b and 410c.

The use of M-wire, N-phase encoding permits a number of bits to be encoded in a plurality of symbols where the bits per symbol is not an integer. In the simple example of a 3-wire system, there are 3 available combinations of 2 wires that may be driven simultaneously, and 2 possible combinations of polarity on the pair of simultaneously driven wires, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 5:
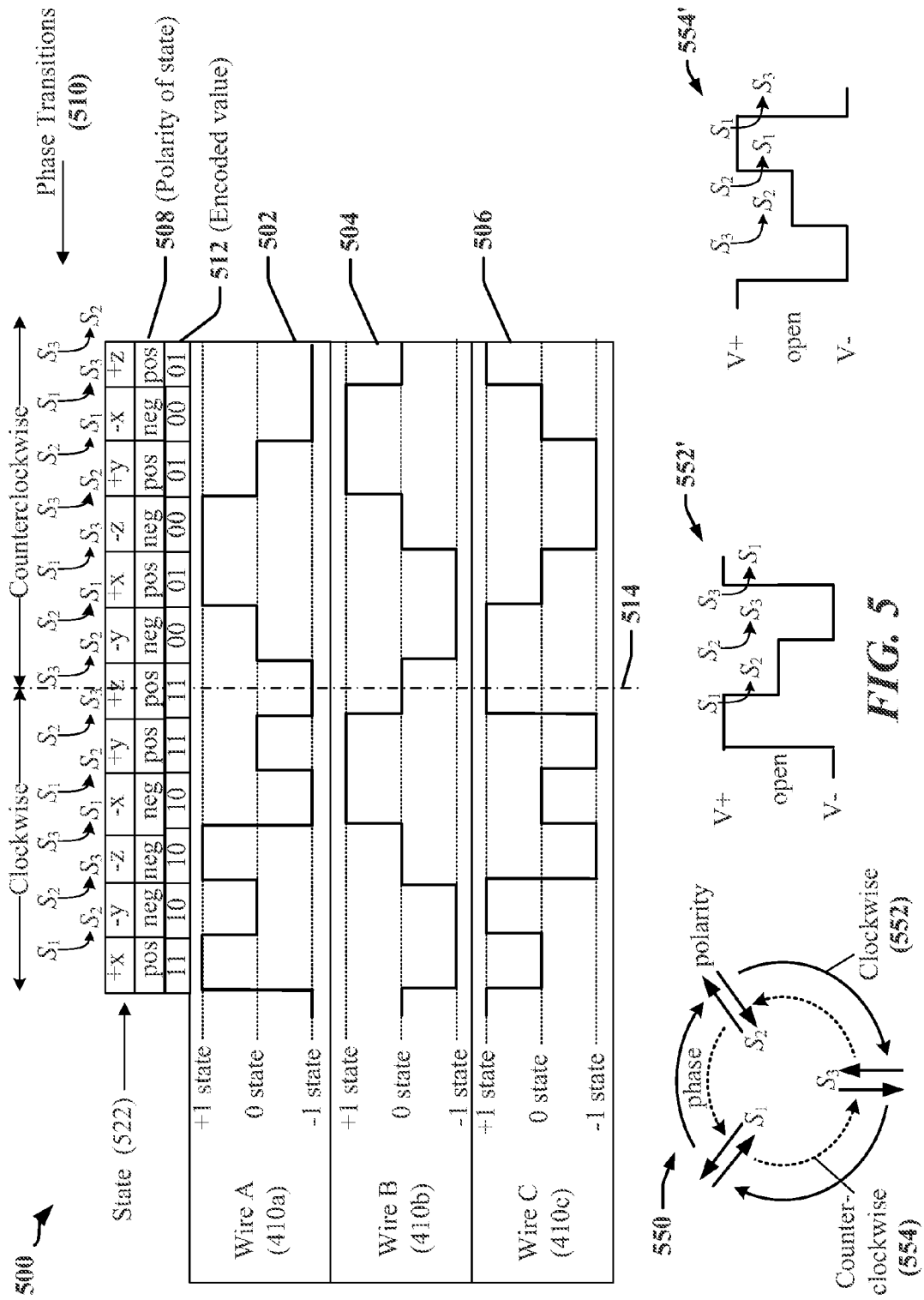
FIG. 5 illustrates signaling in an N-phase polarity encoded interface.

FIG. 5 illustrates an example of signaling 500 employing a three-phase modulation data-encoding scheme based on the circular state transition diagram 550. According to the data-encoding scheme, a three-phase signal may rotate in two directions and may be transmitted on three conductors 410a, 410b and 410c. Each of the three signals is independently driven on the conductors 410a, 410b, 410c. Each of the three signals includes the three-phase signal, with the signal on each conductor 410a, 410b and 410c being 120 degrees out of phase relative to the signals on the other two conductors 410a, 410b and 410c. At any point in time, each of the three conductors 410a, 410b, 410c is in a different one of the states {+1, 0, −1}. At any point in time, each of the three conductors 410a, 410b, 410c in a 3-wire system is in a different state than the other two wires. However, when more than three conductors or wires are used, two or more pairs of wires may be in the same state. The illustrated encoding scheme also encodes information in the polarity of the two conductors 410a, 410b and/or 410c that are actively driven to the +1 and −1 states. Polarity is indicated at 508 for the sequence of states depicted.

At any phase state in the illustrated three-wire example, exactly two of the conductors 410a, 410b, 410c carry a signal which is effectively a differential signal for that phase state, while the third conductor 410a, 410b or 410c is undriven. The phase state for each conductor 410a, 410b, 410c may be determined by voltage difference between the conductor 410a, 410b or 410c and at least one other conductor 410a, 410b and/or 410c, or by the direction of current flow, or lack of current flow, in the conductor 410a, 410b or 410c. As shown in the state transition diagram 550, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition may be used to encode a logic 1, while counter-clockwise rotations ($S_1$ to $S_3$), ($S_3$ to $S_2$), and/or ($S_2$ to $S_1$) at the state transition may be used to encode a logic 0. Accordingly a bit may be encoded at each transition by controlling whether the signal is "rotating" clockwise or counter-clockwise. For example, a logic 1 may be encoded when the three wires 410a, 410b, 410c transition from phase state $S_1$ to phase state $S_2$ and a logic 0 may be encoded when the three wires 410a, 410b, 410c transition from phase state $S_1$ to phase state $S_3$. In the simple three-wire example depicted, direction of rotation may be easily determined based on which of the three wires 410a, 410b, 410c is undriven before and after the transition.

Information may also be encoded in the polarity of the driven conductors 410a, 410b, 410c or direction of current flow between two conductors 410a, 410b, 410c. Signals 502, 504, and 506 illustrate voltage levels applied to conductors 410a, 410b, 410c, respectively at each phase state in a three-wire, three-phase link. At any time, a first conductor 410a, 410b, 410c is coupled to a positive voltage (+V, for example), a second conductor 410a, 410b, 410c is coupled to a negative voltage (−V, for example), while the third conductor 410a, 410b, 410c may be open-circuited or otherwise undriven. As such, one polarity encoding state may be determined by the current flow between the first and second conductors 410a, 410b, 410c or the voltage polarities of the first and second conductors 410a, 410b, 410c. In some embodiments, two bits of data may be encoded at each phase transition. A decoder may determine the direction of signal phase rotation to obtain the first bit, and the second bit may be determined based on the polarity difference between two of the signals 502, 504 and 506. The decoder having determined direction of rotation can determine the current phase state and the polarity of the voltage applied between the two active connectors 410a, 410b and/or 410c, or the direction of current flow through the two active conductors 410a, 410b and/or 410c.

In the example of the three-wire, three-phase link described herein, one bit of data may be encoded in the rotation, or phase change in the three-wire, three-phase link, and an additional bit may be encoded in the polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

Figure 6:
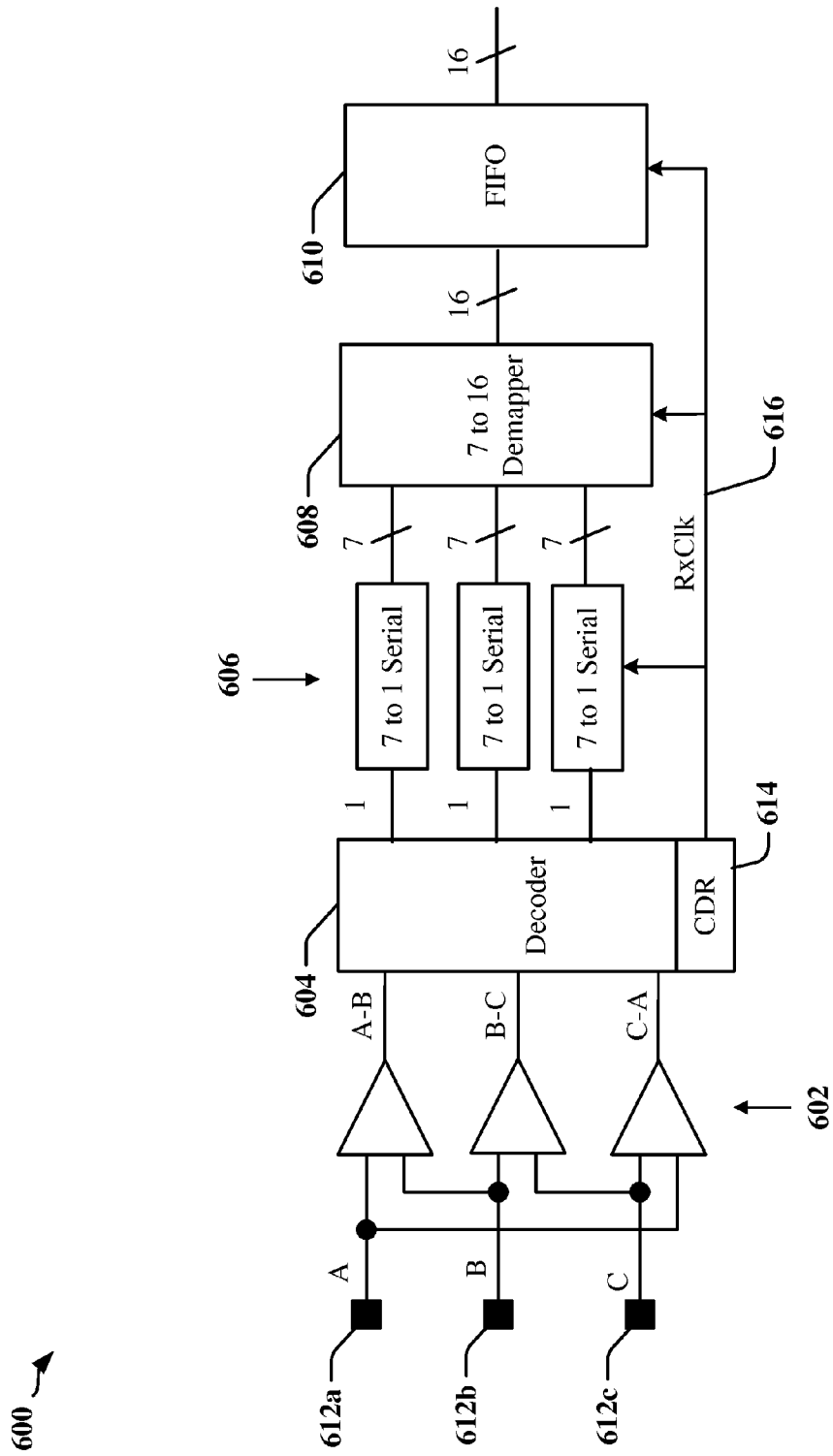
FIG. 6 illustrates a 3-phase polarity data decoder.

FIG. 6 is a block schematic drawing 600 illustrating an example of a receiver in a 3-phase interface. Comparators 602 and decoder 604 are configured to provide a digital representation of the state of each of three transmission lines 612a, 612b and 612c, as well as the change in the state of the three transmission lines compared to the state transmitted in the previous symbol period. As can be seen from the illustrated example, the voltage of each connector 612a, 612b or 612c may be compared to the voltages of the other two connectors 612a, 612b and/or 612c to determine the state of each connector 612a, 612b or 612c, such that the occurrence of a transition may be detected and decoded by the decoder 604 based on the outputs of the comparators 602. Seven consecutive states are assembled by serial to parallel convertors 606, which produce sets of 7 symbols to be processed by demapper 608 to obtain 16 bits of data that may be buffered in the FIFO 610. The decoder 604 may include a CDR circuit 614 configured to extract a receive clock 616 from transitions in signaling states between consecutive pairs of transmitted symbols.

TABLE 1

| | Wire amplitude | | | Diff. Rx output | | | Receiver Digital Output | | |
|---|---|---|---|---|---|---|---|---|---|
| State | A | B | C | A-B | B-C | C-A | Rx_AB | Rx_BC | Rx_CA |
| +x | +V | 0 | +V/2 | +V | −V/2 | −V/2 | 1 | 0 | 0 |
| −x | 0 | +V | +V/2 | −V | +V/2 | +V/2 | 0 | 1 | 1 |
| +y | +V/2 | +V | 0 | −V/2 | +V | −V/2 | 0 | 1 | 0 |
| −y | +V/2 | 0 | +V | +V/2 | −V | +V/2 | 1 | 0 | 1 |
| +z | 0 | +V/2 | +V | −V/2 | −V/2 | +V | 0 | 0 | 1 |
| −z | +V | +V/2 | 0 | +V/2 | +V/2 | −V | 1 | 1 | 0 |

Table 1 illustrates the operation of the differential receivers 602. In the example, the wire states 522 may be encoded in the voltage amplitude on the three wires 612a, 612b and 612c such that the +1 state of a wire is represented as a voltage +V volts, the −1 state of the wire is represented as 0 volts and the undriven state is represented or approximated as +V/2 volts. In particular, Table 1 illustrates the outputs of the differential receivers 602 for each wire state 522 in the 3-wire 3-Phase Polarity encoding system. A receiver/decoder may be configured to output a code at the digital output of the receiver for each symbol decoded.

Certain N-wire interfaces may be adapted to provide increased bandwidth through the use of DDR clocking, whereby a new symbol is transmitted at both the rising and falling edges of a transmit clock. However, conventional CDR circuits may be unable to respond to DDR clocking and/or conventional CDR circuits may limit the maximum possible operation speed of an N! wire or N-phase interface.

Figure 7:
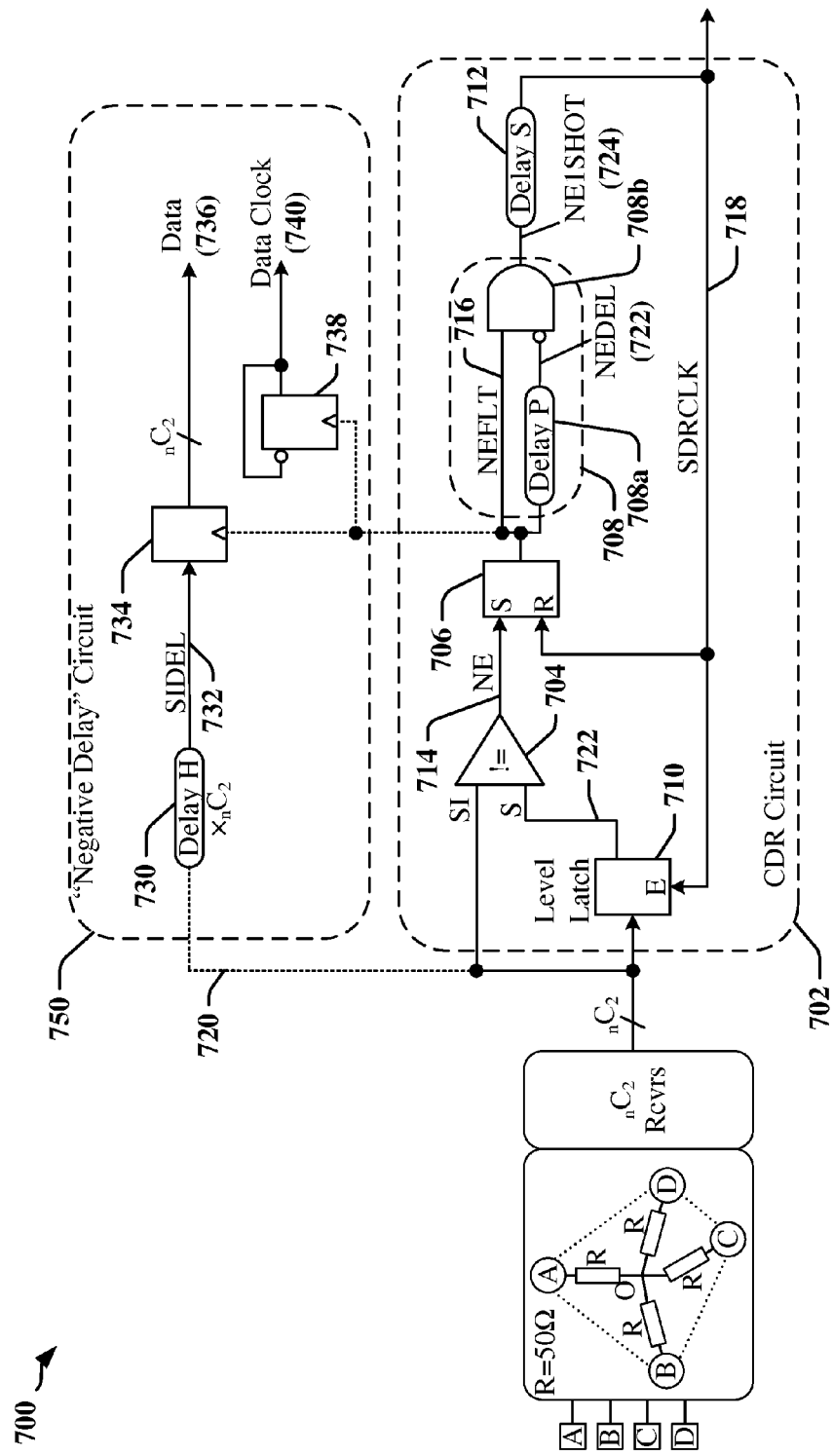
FIG. 7 illustrates a first clock and data recovery (CDR) circuit according to certain aspects disclosed herein.
Figure 8:
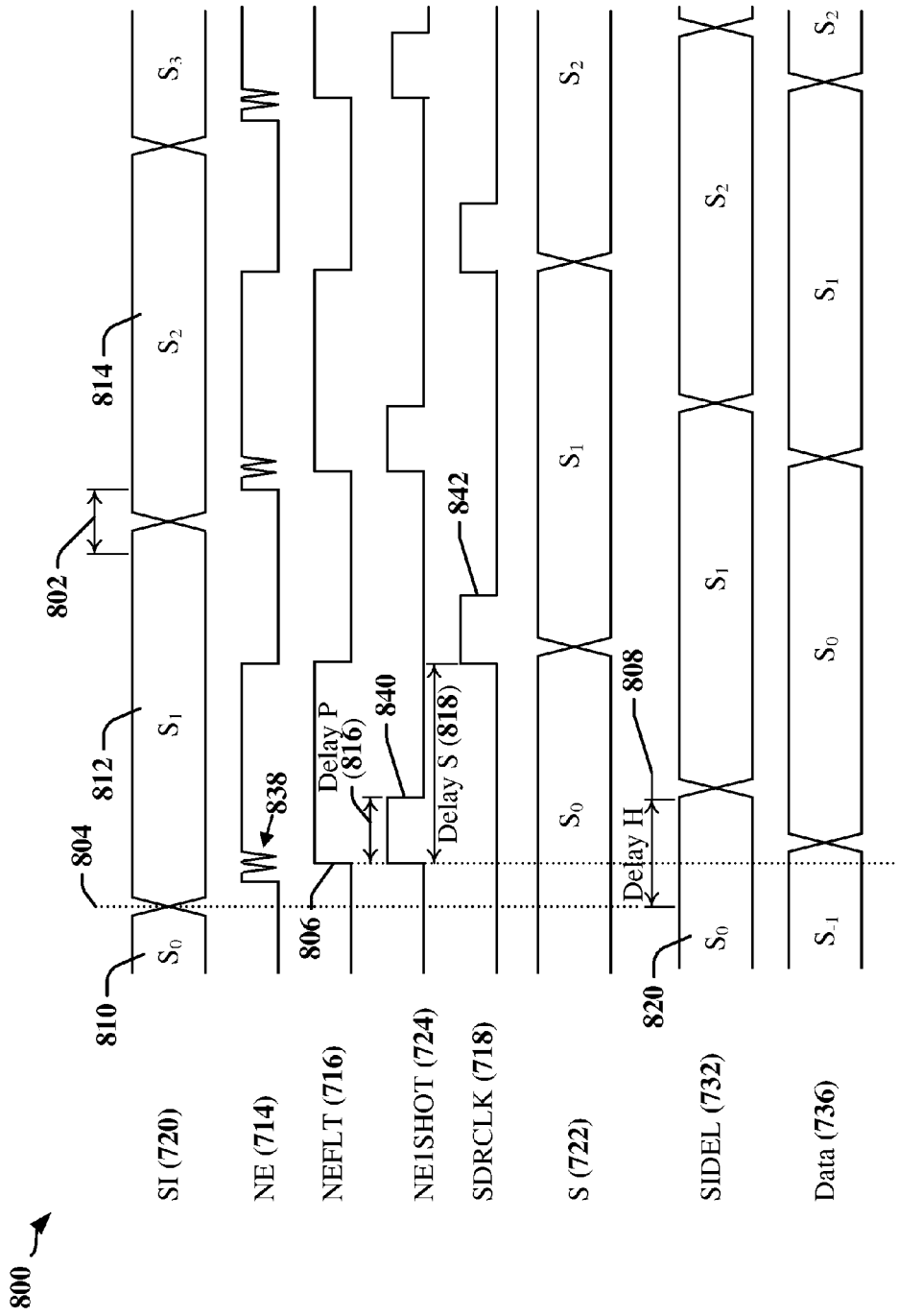
FIG. 8 illustrates timing of certain signals generated by the clock and data recovery circuit of FIG. 7.

FIG. 7 is a schematic diagram 700 illustrating an example of a CDR circuit 702 that illustrates certain aspects of clock recovery from a multi-wire interface, and FIG. 8 shows an example of timing of certain signals generated by the CDR circuit 702. The CDR circuit 702 may be used in a 4-wire data transmission scheme that embeds clock information in transmitted symbols, for example. The CDR circuit 702 includes a comparator 704, a set-reset latch 706, a one-shot element 708, a second analog delay device 712, and a level latch 710. The comparator 704 may compare a first instance of the first state transition signal (SI) 720 and a level-latched instance of the first state transition signal (S) 722, and comparator 704 outputs a comparison signal (NE signal) 714. The set-reset latch 706 may receive the NE signal 714 from the comparator 704 and provide a filtered version of the comparison signal (NEFLT signal) 716. The first analog delay device 708a may receive the NEFLT signal 716 and produce a delayed instance of NEFLT signal 716 as the NEDEL signal 722. A gating element 708b receives the NEFLT signal 716 and the NEDEL signal 722 and outputs the NE1SHOT signal 724. The NE1SHOT signal 724 provides a pulse 840 (see FIG. 8) that is effectively triggered by a transition between symbols 810 and 812, where the pulse has a duration 816 determined by the first delay element 708a. The clock signal (SDRCLK) 718 generated by the CDR 702 is obtained at the output of a second analog delay device 712, which receives and delays the NE1SHOT signal 724. Accordingly, SDRCLK 718 includes pulses 842 that have the duration 816 determined by the first delay element 708a. The set-reset latch 706 may be reset based on the state of the SDRCLK 718. The level latch 710 receives the SI transition signal 720 and outputs the level-latched instance of the S transition signal 722, where the level latch 710 is triggered by an edge on the SDRCLK 718.

In operation, when a transition occurs between a current symbol ($S_0$) 810 a next symbol ($S_1$) 812, the state of the SI signal 720 begins to change. The NE signal 714 transitions high when the comparator 704 first detects a difference between SI 720 and S 722, causing the set-reset latch 706 to be asynchronously set. Accordingly, the NEFLT signal 716 transitions high, and this high state is maintained until the set-reset latch 706 is reset when SDRCLK 718 becomes high. The SDRCLK 718 transitions to a high state in delayed response to the rising of the NEFLT signal 716, where the delay is attributable to the analog delay element 712.

As transitions between symbols occur, one or more intermediate or indeterminate states may occur on the SI signal 720 due to inter-wire skew, signal overshoot, signal undershoot, crosstalk, and so on. The intermediate states on SI 720 may be regarded as invalid data, and these intermediate states may cause spikes 838 in the NE signal 714 as the output of the comparator 704 returns towards a low state for short periods of time. The spikes 838 typically do not affect NEFLT signal 716 output by the set-reset latch 706, because the set-reset latch 706 effectively blocks and/or filters out the spikes 838 on the NE signal 714 from the NEFLT signal 716.

The one-shot circuit 708 outputs a high state in the NE1SHOT signal 724 after the rising edge of the NEFLT signal 716. The one-shot circuit 708 maintains the NE1SHOT signal 724 at a high state for the delay P period 816 before the NE1SHOT signal 724 returns to the low state. The resultant pulse 740 on the NE1SHOT signal 724 propagates to the SDRCLK signal 718 after the delay S period 818 caused by the analog delay S element 712. The high state of the SDRCLK signal 718 resets the set-reset latch 706, and the NEFLT signal 716 transitions low. The high state of SDRCLK signal 718 also enables the level latch 710 and the value of the SI signal 720 is output as the S signal 722.

The comparator 704 detects when the S signal 722 corresponding to the $S_1$ symbol 812 matches the symbol $S_1$ symbol 812 on the SI signal 720, and the output of the comparator 704 drives the NE signal 714 low. The trailing edge of the pulse 840 on the of NE1SHOT signal 724 propagates to the SDRCLK signal 718 after the delay S period 818 caused by the analog delay S element 712. When a new symbol $S_2$ 814 is being received, the SI signal 720 begins its transition to the value corresponding to the symbol $S_2$ 814 after the trailing edge 842 of the SDRCLK signal 718.

SDRCLK 718 may be provided as an output to synchronize one or more functions of a receiving device. As discussed herein, the SDRCLK 718 includes a sequence of pulses 842 that have a pulse width 816 determined by the first delay element 708a, and the timing of the pulses 842 with respect to transitions on the SI signal 720 may be determined by the second delay element 712. In some instances, additional circuits may be provided to improve operation of a receiver that uses the CDR circuit 702. In one example, a negative delay circuit 750 may be employed to provide an improved setup time for registers 734 that capture a symbol from the SI signal 720.

In the negative delay circuit 750, an $_nC_2$ elements 730 delay the data on the SI signals 720 by a delay period or value H 808, producing a delayed SI signal (SIDEL signal) 732. For a 4-wire link, $_nC_2 = {_4C_2} = 6$ delay elements 730 may be used. The SIDEL signal 732 is sampled by a sampling latch or register 734 which provides a data output 736. The sampling latch 734 is clocked by the rising edge 806 of NEFLT 716, which indicates, for example, that a transition between a first symbol ($S_0$) 810 to a second symbol ($S_1$) 812 has begun. Since the SIDEL signal 732 lags the SI signal 720 by the delay period or value 808, the NEFLT signal 716 causes the register 734 to capture a delayed version of the first symbol ($S_0$) 810. The duration of the delay period or value H 808 provided by the delay elements 730 effectively provides a negative hold time, and the delay period or value H 808 may be configured to satisfy hold time or timing requirements specified for the register 734 and/or other components of the CDR 702 or negative delay circuit 750.

Figure 9:
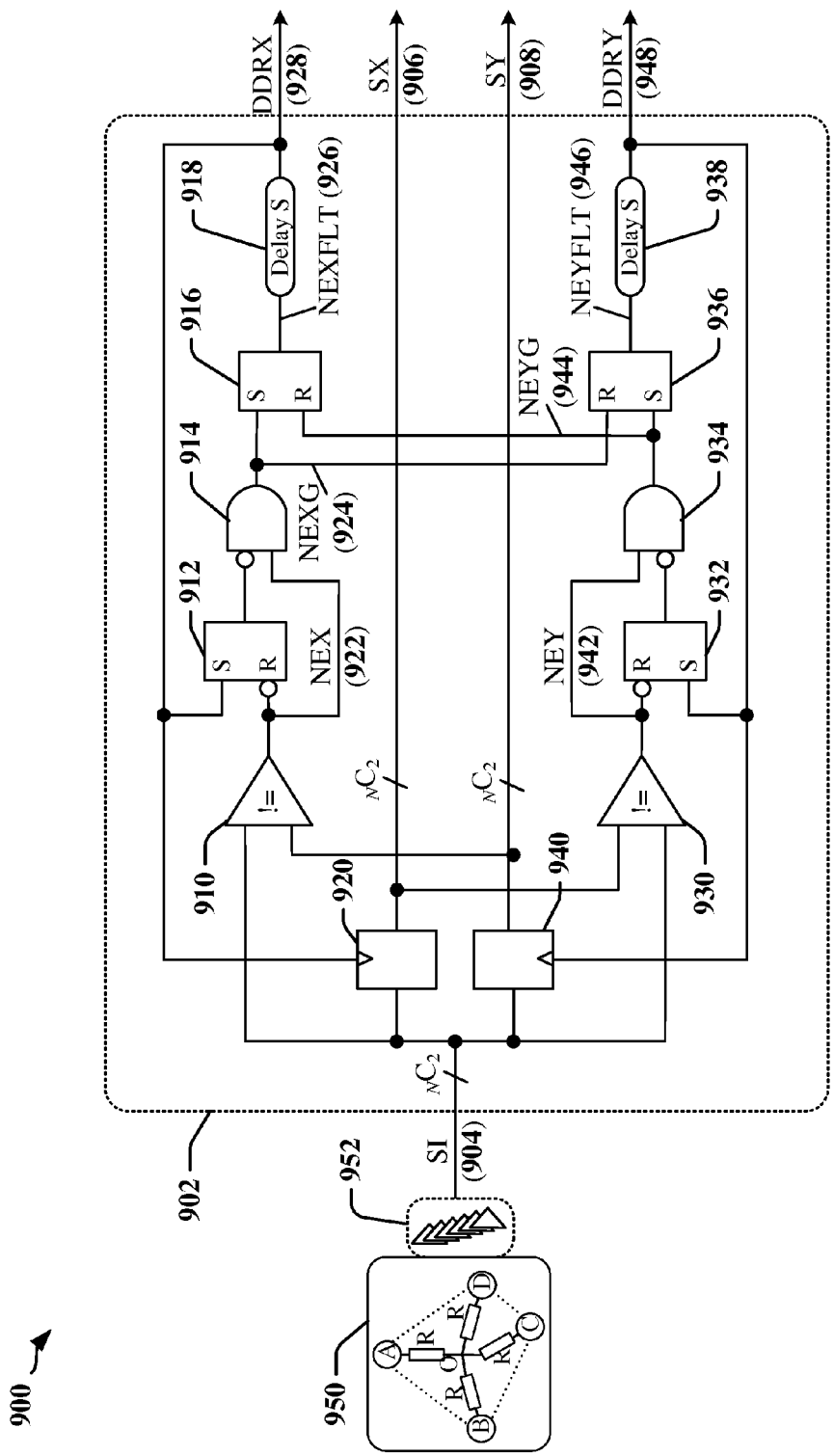
FIG. 9 illustrates a second clock and data recovery circuit according to certain aspects disclosed herein.
Figure 10:
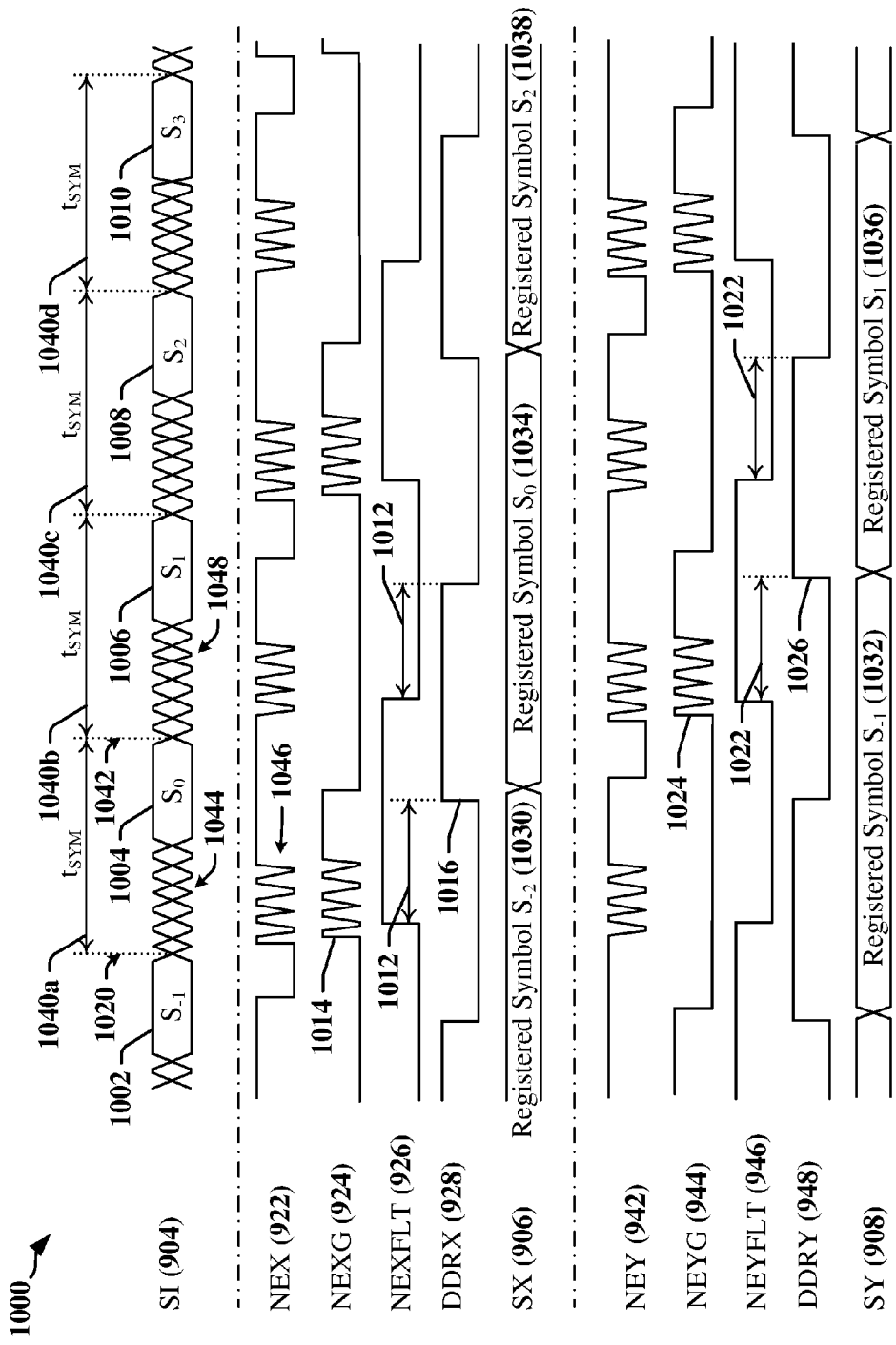
FIG. 10 is a timing diagram illustrating the operation of the clock and data recovery circuit of FIG. 9.

FIG. 9 is a block diagram 900 illustrating a CDR circuit 902 that is configured according to certain aspects disclosed herein. FIG. 10 is a timing diagram 1000 illustrating the operation of the CDR circuit 902 under typical operating conditions. The CDR circuit 902 may be used with a variety of multi-wire interfaces, including interfaces that use N! encoding, N-phase encoding, and other encoding schemes that use symbol transition clocking, including interfaces that employ single-ended multi-wire communication links.

In the example depicted in FIG. 9, the CDR circuit 902 is adapted to extract clock information from a sequence of symbols transmitted over N! interface 950, and to provide an X clock on the DDRX signal 928 and a complementary Y clock on the DDRY signal 948. A rising edge of DDRX signal 928 may be used by an external circuit to read or capture registered even symbols (SX) 906, while a rising edge of DDRY signal 948 may be used by an external circuit to read or capture registered odd symbols (SY) 908. The DDRX signal 928 and the DDRY signal 948 may be generated from transitions detected between consecutive raw symbols in the input signal (SI) 904. The clock information is encoded in the transitions at the end of the symbol periods 1040a-1040d, which correspond to odd symbols 1002, 1006, 1010 and even symbols 1004, 1008.

Output symbols in SX 906 include registered copies 1034, 1038 of symbols transmitted in SI 904 during the illustrated even transmission intervals 1040a, 1040c. For example, the $S_0$ and $S_2$ symbols 1004, 1008 are captured by a set of latches or register devices 920 from SI 904 and provided in SX 906 as registered $S_0$ and $S_2$ symbols 1034, 1038, respectively. Output symbols in SY 908 are registered copies 1032, 1036 of symbols transmitted in SI 904 during odd transmission intervals, including the illustrated odd transmission intervals 1040b, 1040d. For example, the $S_{-1}$ and $S_1$ symbols 1002, 1006 are captured by a set of latches or register devices 940 from SI 904 and provided in SY 908 as registered $S_{-1}$ and $S_1$ symbols 1032, 1036, respectively. The register devices 920 and 940 provide a stabilized and delayed version of the symbols in SI 904.

The generation of the DDRX signal 928 may be understood by considering the operation of certain circuitry of the CDR 902 following a transition between an odd symbol ($S_{-1}$) 1002 and a next even symbol ($S_0$) 1004. The transition occurs at the beginning 1020 of a symbol transmission period 1040a, when the symbol $S_0$ 1004 may be unstable for a portion 1044 of the symbol transmission period 1040a, due to differences in rise and fall times of the signal wires carrying the symbols in SI 904 for example. Comparison logic 910 detects a difference between $S_0$ 1004 and a registered copy 1032 of $S_{-1}$ 1002 provided in the SY signal 908, typically using a comparator coupled to the output of the comparator that receives the registered copy 1032 of $S_{-1}$ 1002 from the registers 940. The operation of the registers 940 is controlled by the circuitry that generates the DDRY signal 948, and these registers 940 capture the odd symbols 1002, 1006 and provide registered symbols 1032, 1036.

When the current symbol 1004 is different from the registered copy 1032 of $S_{-1}$ 1002, the NEX signal 922 output by the comparison logic 910 is in a logic high state. In the first symbol period 1040a, for example, the SY signal 908 reflects the registered symbol $S_{-1}$ 1032 output by the registers 940 and, consequently, the comparison logic 910 that is used to generate DDRX 928 compares the value of SI 904 to the registered symbol $S_{-1}$ 1032. At the beginning of the first symbol period 1040a, the SI 904 is in a transitional period 1044 as it changes from symbol $S_{-1}$ 1002 to $S_0$ 1004 and the NEX signal 922 output by the comparison logic 910 may have some transitional spikes 1046 until SI 904 achieves stability and reflects the true value of $S_0$ 1004, such that the NEX signal 922 output by the comparison logic 910 is in a stable logic high state.

When the NEX signal 922 is in the logic high state, the reset condition is removed from a first set-reset latch 912. However, the output of the first set-reset latch 912 remains in a logic low state because the DDRX signal 928, which controls the set input of the first set-reset latch 912, is in a logic low state at the start 1020 of the transition period 1044. Since the output of the first set-reset latch 912 is in the logic low state, the gating logic gate 914 is enabled and therefore passes the NEX signal 922 as the NEXG signal 924. The difference detected by comparison logic 910 between consecutive symbols $S_{-1}$ 1002 and $S_0$ 1004 causes a transition 1014 in the NEXG signal 924 that sets a second set-reset latch 916 and resets a corresponding set-reset latch 936 in the circuitry that generates the DDRY signal 948. The comparison logic 910 may detect a difference during the transition period 1044 between the consecutive symbols $S_{-1}$ 1002 and $S_0$ 1004. A corresponding NEYG signal 944 controls the reset input of the second set-reset latch 916, and the NEYG signal 944 is in the logic low state when the NEXG signal 924 is in the logic high state. Accordingly, the NEXFLT signal 926 provided as the output of the second set-reset latch 916 is driven high.

The DDRX signal 928 is a delayed version of the NEXFLT signal 926, because of the delay 1012 introduced by a first delay element 918. The first delay element 918 may be configured to provide a rising edge on the DDRX signal 928 that occurs after the current symbol 1004 has been stable for a sufficient period of time to satisfy the minimum set-up time specified for the registers 920. The transition 1016 from the logic low state to the logic high state on the DDRX signal 928 triggers the registers 920 that capture the raw symbol $S_0$ 1004 from SI 904. The presence of the logic high state on the DDRX signal 928 sets the first set-reset latch 912, thereby forcing the output of the gating logic 914 to the logic low state. It will be appreciated that the output of the first set-reset latch 912 may be configured to prioritize the set input over the reset input. When the first set-reset latch 912 is set, the NEXG signal 924 goes low, but the second set-reset latch 916 maintains its output in the logic high state until reset by the circuitry that generates the DDRY signal 948. As will be seen, the reset of the second set-reset latch 916 occurs when the NEYG signal 944 transitions to the logic high state after detection of a transition from an even symbol 1004, 1008 to an odd symbol 1006, 1010. Accordingly, the NEXFLT signal 926 remains in the logic high state for a duration ($t_{SYM}$) equivalent to approximately one symbol transmission period.

The transition of the DDRX signal 928 to the logic low state is delayed by the first delay element 918 with respect to the corresponding transition of the NEXFLT signal 926. The DDRX signal 928 remains in the logic high state for a duration ($t_{SYM}$) equivalent to approximately one symbol transmission period, commencing at a point 1016 when $S_0$ 1004 is stable and falling when $S_1$ 1006 is stable. Accordingly, the comparison logic 910 detects no difference between its inputs when the set input of the first latch 912 is released and the first latch 912 is reset, thereby enabling the gating logic 914 and the detection of the transition between $S_1$ 1006 and $S_2$ 1008.

The circuitry that generates the DDRX signal 928 effectively ignores the transition between $S_0$ 1004 and $S_1$ 1006, but is enabled to respond to the transition between $S_1$ 1006 and $S_2$ 1008 after the NEXFLT signal 926 and DDRX signal 928 have been reset by the circuitry that generates the DDRY signal 948. As can be seen from the timing diagram 1000, the resulting DDRX signal 926 has an approximate 50% duty cycle and the registered even symbols 1030, 1034 and 1038 can be sampled during a time period that is approximately equivalent to two symbol transmission periods ($t_{SYM}$).

The DDRY signal 948 is generated in a manner that mirrors the manner of generating the DDRX signal 926. DDRY signal 948 generation commences following a transition between an even symbol $S_0$ 1004 and a next odd symbol $S_1$ 1006. The transition occurs at the beginning 1042 of a symbol transmission period 1040b, when the symbol $S_1$ 1006 may be unstable for a portion 1048 of the symbol transmission period 1040b, due to differences in rise and fall times of the signal wires carrying the symbols in SI 904, for example. Comparison logic 930 detects a difference between the $S_1$ 1006 and a registered copy 1034 of $S_0$ 1004. The comparison logic 930 may include a plurality of comparators that receive the registered copy 1034 of $S_0$ 1004 from the registers 920. The operation of the registers 920 is controlled by the circuitry that generates the DDRX signal 928, and these registers 920 capture the even symbols 1004 and 1008 and provide registered symbols 1034 and 1038.

The comparison logic 930 produces a NEY signal 942 that is in the logic high state when $S_1$ 1006 is different from the registered copy 1034 of the $S_0$ 1004. When the NEY signal 942 is in the logic high state, the reset condition is removed from a third set-reset latch 932. However, the output of the third set-reset latch 932 remains low because the DDRY signal 948 that controls the set input of the third set-reset latch 932 is in a logic low state at the start 1042 of the transition period 1048. The logic low output of the third set-reset latch 932 enables the gating logic 934, which therefore passes the NEY signal 942 as the NEYG signal 944. Thus, the difference detected by comparison logic 930 between consecutive symbols $S_0$ 1004 and $S_1$ 1006 causes a transition 1024 in the NEYG signal 944 to a logic high level that sets a fourth set-reset latch 936 and resets the second set-reset latch 916 in the circuitry that generates the DDRX signal 928. The corresponding NEXG signal 924 controls the reset input of the fourth set-reset latch 936, and the NEXG signal 924 is in the logic low state when the NEYG signal 944 is in the logic high state. Accordingly, the NEYFLT signal 946 provided as the output of the fourth set-reset latch 936 is driven to the logic high state.

The DDRY signal 948 is a delayed version of the NEYFLT signal 946, where the DDRY signal 948 is delayed by the delay period 1022 introduced by second delay element 938. The second delay element 938 may be configured to provide a rising edge on the DDRY signal 948 that occurs after $S_1$ 1006 has been stable for a sufficient period of time to satisfy the minimum set-up time specified for the registers 940. The second delay element 938 may be matched with the first delay element 918 in the circuitry that generates the DDRX signal 928. The transition 1026 from the logic low state to the logic high state on the DDRY signal 948 triggers the registers 940, which captures $S_1$ 1006 from SI 904. A logic high state on the DDRY signal 948 sets the third set-reset latch 932, thereby forcing the output of the gating logic 934 to the logic low state. It will be appreciated that the output of the third set-reset latch 932 may be configured to prioritize the set input over the reset input. When the third set-reset latch 932 is set, the NEYG signal 944 goes low, but the fourth set-reset latch 936 maintains its output in the logic high state until reset by the circuitry that generates the DDRX signal 928. As described above, the reset of the fourth set-reset latch 936 occurs when the NEXG signal 924 transitions to the logic high state after detection of a transition from an odd symbol 1006 to an even symbol 1008. Accordingly, the NEYFLT signal 946 remains in the logic high state for the duration of approximately one symbol transmission period ($t_{SYM}$).

The transition of the DDRY signal 948 to the logic low state is delayed by the second delay element 938 with respect to the corresponding transition of the NEYFLT signal 946. The DDRY signal 948 remains in the logic high state for the duration of approximately one symbol transmission period ($t_{SYM}$), commencing at a point 1026 when $S_1$ 1006 is stable, and falling when $S_2$ 1008 is stable. Accordingly, the circuitry that generates the DDRY signal 948 effectively ignores the transition between $S_1$ 1006 and $S_2$ 1008, and responds to the next transition after the NEYFLT signal 946 and DDRY signal 948 have been reset by the circuitry that generates the DDRX signal 928. As can be seen from the timing diagram 1000, the resulting DDRY signal 946 has an approximate 50% duty cycle and is approximately 180° out-of-phase with the DDRX signal 926, and the registered odd symbols 1032 and 1036 are available for sampling for approximately two symbol transmission periods ($t_{SYM}$).

After a system reset, one or more of the registers 920, 940 and set-reset latches 912, 916, 932, 936 may be initialized to ensure that the CDR circuit 902 attains a "steady-state" operating condition and produces reliable output clock signals 928 and 948. In one example, the CDR circuit 902 may be initialized by controlling the startup condition of the second and fourth set-reset latches 916 and 936 that produce that DDRX signal 928 and DDRY signal 948, respectively. A system reset may cause the first set-reset latch 916 to be held in a forced "Reset" condition for a period of time that exceeds the delay period (Delay S 1012) provided by the first delay element 918, while causing the second set-reset latch 936 to be held in a forced "Set" condition for a period of time that exceeds the delay period (Delay S 1022) provided by the second delay element 938. At the point at which the system reset condition is removed, the NEXFLT signal 926 and the DDRX signal 928 are in the logic low state, while the NEYFLT signal 946 and the DDRY signal 948 are in the logic high state. For at least the duration of Delay S 1022, the output of the third set-reset latch 932 is forced to the logic high state, causing the gate logic 934 to block the NEY signal 942. The NEY signal 942 is passed only after the fourth set-reset latch 936 is reset by the operation of the circuitry that generates the DDRX signal 928, and the DDRY signal 948 subsequently transitions low after the expiration of Delay S 1022 associated with the delay element 938. It will be appreciated that the NEYG signal 944 is in the logic low state until the DDRY 948 signal has transitioned to the logic low state and the comparison logic 930 has detected a difference between the symbol value captured by the registers 920 and the value of the current raw symbol in SI 904.

The DDRX signal 928 is in the logic low state when the system reset is removed, and remains in the logic low state for at least the delay period provided by the first delay element 918. Accordingly, the output of the first set-reset latch 912 may be in the logic low state upon removal of the system reset because DDRX signal 928 continues to hold the "Set" input of the first set-reset latch 912 in a low condition and the first set-reset latch 912 may have initialized with its output in the logic low state, or because the comparison logic 910 may have reset the first set-reset latch 912 during the time that system reset was applied. Even if the output of the first set-reset latch 912 is in the logic high state after system reset is removed, the first detection of a difference between the value stored in the odd symbol registers 940 and the current symbol in SI 904 by the comparison logic 910 resets the first set-reset latch 912, enabling the NEX signal 922 to control the value of NEXG 924. When the comparison logic 910 detects a difference between the value stored in the odd symbol registers 940 and the current symbol in SI 904, the second set-reset latch 916 is set and the fourth set-reset latch 936 is cleared, thereby causing the DDRX signal 928 to transition to the logic high state and the DDRY signal 948 to transition to the logic low state after the Delay S 1022 period. The rising edge of the DDRX signal 928 triggers the even symbol registers 912 to capture the current symbol in SI 904. At this point the CDR 902 proceeds as described for steady-state operation.

It will be appreciated that the CDR 902 may be configured to cause other pre-configurations of initial conditions of the registers 920, 940 and/or set-reset latches 912, 916, 932, 936 in response to a system reset. For example, a different start-up strategy may be used if the first and second delay elements 918 and 938 provide substantially different delay periods, if different duty cycles for the DDRX and DDRY signals 928, 948 are desired and/or based on other requirements, including requirements related to clock or control signals provided to external circuits and devices.

Figure 11:
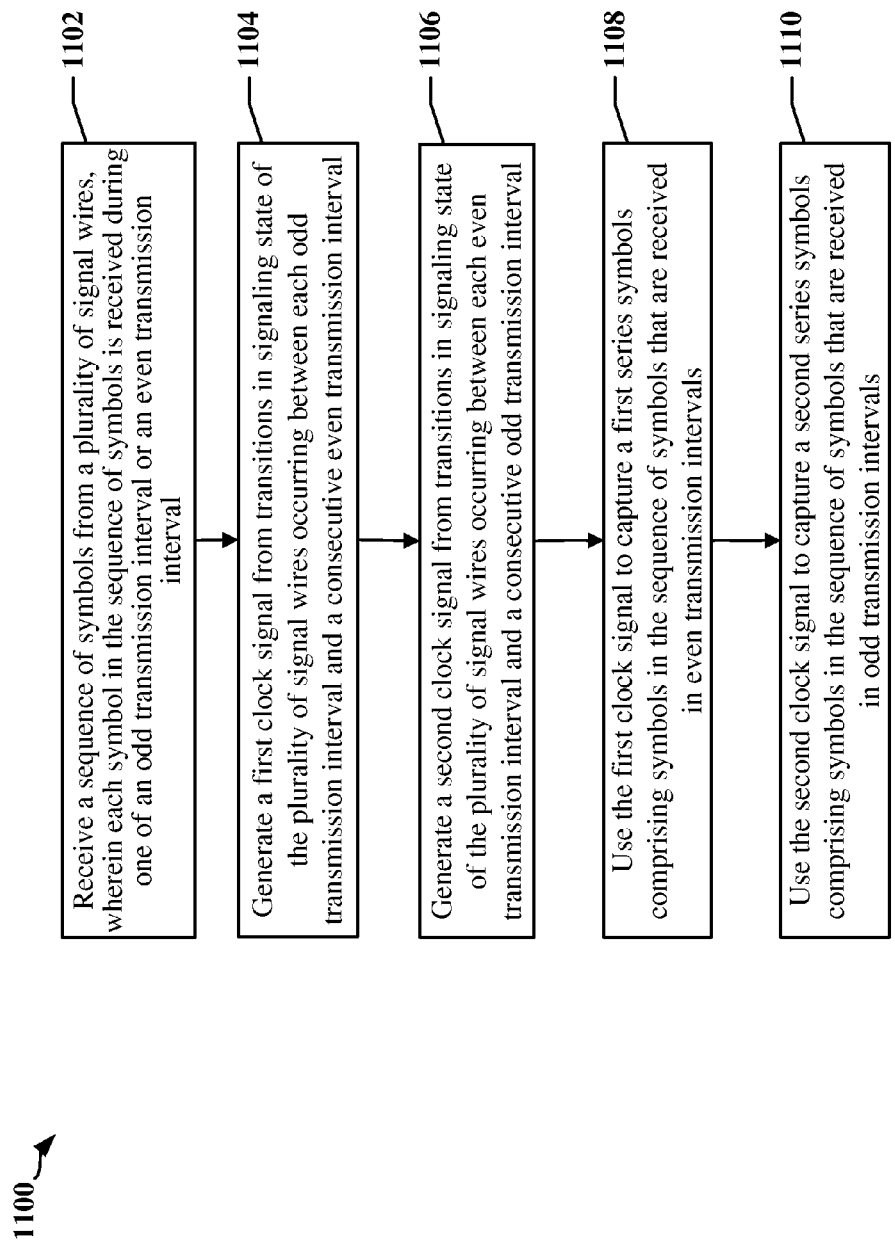
FIG. 11 is a flowchart illustrating a method for data communications according to certain aspects disclosed herein.

FIG. 11 is a flowchart 1100 illustrating a method for data communications on an N-wire communications link. At step 1102, a sequence of symbols may be received from a plurality of signal wires. Each symbol in the sequence of symbols is received during one of an odd transmission interval or an even transmission interval.

At step 1104, a first clock signal may be generated from transitions in signaling state of the plurality of signal wires occurring between each odd transmission interval and a consecutive even transmission interval.

At step 1106, a second clock signal is generated from transitions in signaling state of the plurality of signal wires occurring between each even transmission interval and a consecutive odd transmission interval.

At step 1108, the first clock signal may be used to capture a first set of symbols that includes symbols in the sequence of symbols received in even transmission intervals.

At step 1110, the second clock signal may be used to capture a second set of symbols that includes symbols in the sequence of symbols received in odd transmission intervals.

Each odd transmission interval may be immediately preceded by a first even transmission interval and immediately succeeded by a second even transmission interval.

Each pair of consecutive symbols received in the sequence of symbols may include one symbol received during in an odd transmission interval and one symbol received during an even transmission interval.

In some instances, timing of a first edge in the first clock signal is based on a first transition that occurs between a first symbol and a second symbol that is received immediately after the first symbol Timing of a first edge in the second clock signal may be based on a second transition that occurs between the second symbol and a third symbol that is received immediately after the second symbol. Timing of a second edge in the first clock signal may be based on the timing of the first edge in the second clock signal. Timing of a second edge in the second clock signal may be based on timing of a third edge in the first clock signal. The timing of the third edge in the first clock signal may be based on a third transition that occurs between the third symbol and a fourth symbol that is received immediately after the third symbol.

In some examples, generating the first clock signal includes ignoring the second transition. Generating the second clock signal may include ignoring the first transition.

In some instances, each pair of consecutive symbols in the sequence of symbols includes two symbols that are associated with different signaling states on the plurality of signal wires.

In one example, receiving the sequence of symbols from the plurality of signal wires includes receiving differential signals from all possible combinations of two signal wires in the plurality of signal wires. Each symbol in the sequence of symbols may be encoded in a combination of signaling states of the differential signals.

In another example, receiving the sequence of symbols from the plurality of signal wires includes receiving a 3-phase signal from each of three signal wires. The 3-phase signal transmitted on each of the three signal wires may be phase shifted by 120 degrees with respect to the 3-phase signal transmitted on the other signal wires. Each symbol in the sequence of symbols may be encoded in a combination of signaling states of the three signal wires.

Figure 12:
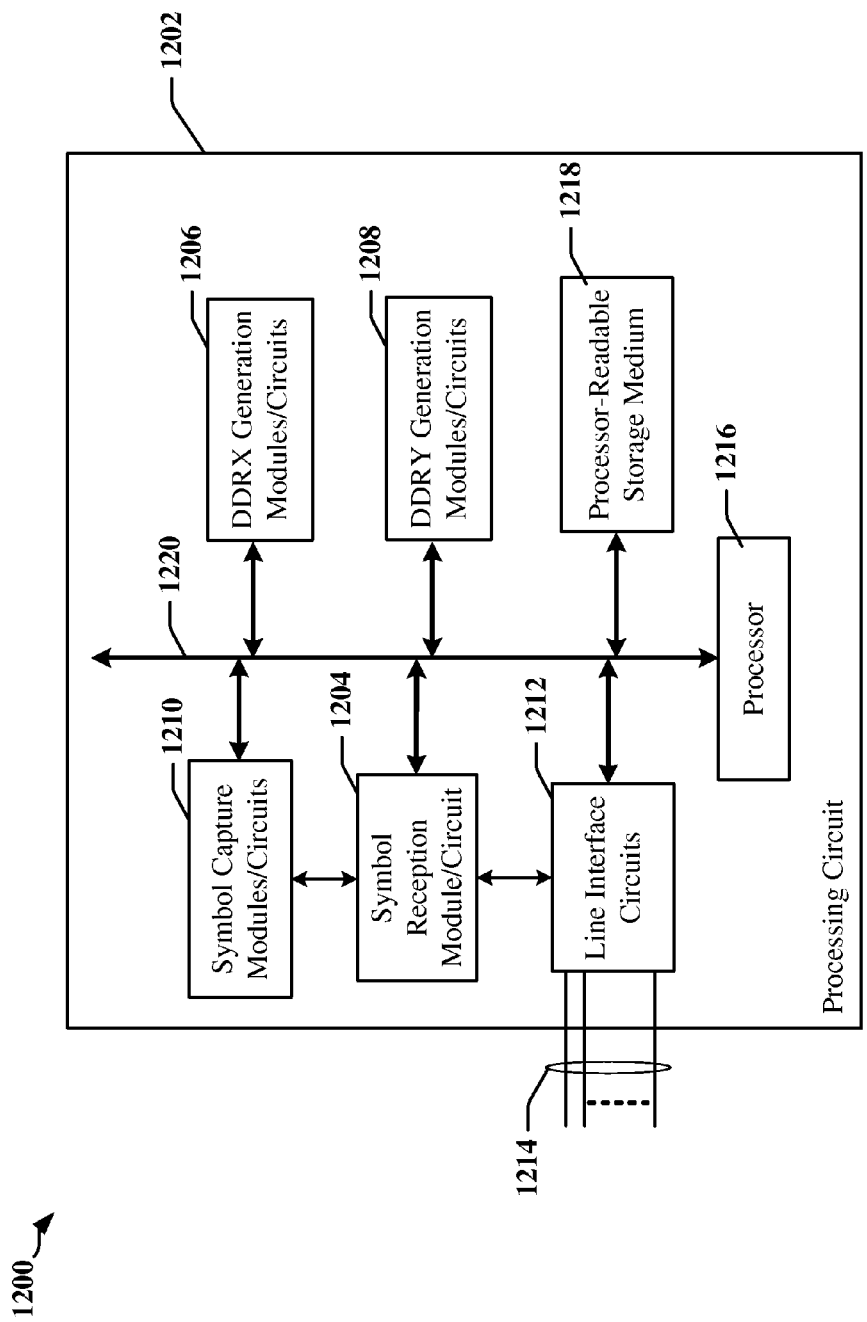
FIG. 12 is a diagram illustrating a simplified example of a hardware implementation for a receiving apparatus according to certain aspects disclosed herein.

FIG. 12 is a diagram 1200 illustrating a simplified example of a hardware implementation for an apparatus employing a processing circuit 1202. The processing circuit typically has a processor 1216 that may include one or more of a microprocessor, microcontroller, digital signal processor, a sequencer and a state machine. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the processor 1216, the modules or circuits 1204, 1206, 1208 and 1210, line interface circuits 1212 configurable to communicate over connectors or wires 1214 and the computer-readable storage medium 1218. The bus 1220 may also link various other circuits such as timing sources, peripherals, voltage regulators, and power management circuits, which are well known in the art, and therefore, will not be described any further.

The processor 1216 is responsible for general processing, including the execution of software stored on the computer-readable storage medium 1218. The software, when executed by the processor 1216, causes the processing circuit 1202 to perform the various functions described supra for any particular apparatus. The computer-readable storage medium 1218 may also be used for storing data that is manipulated by the processor 1216 when executing software, including data decoded from symbols transmitted over the connectors 1214. The processing circuit 1202 further includes at least one of the modules 1204, 1206, 1208 and 1210. The modules 1204, 1206, 1208 and 1210 may be software modules running in the processor 1216, resident/stored in the computer readable storage medium 1218, one or more hardware modules coupled to the processor 1216, or some combination thereof. The modules 1204, 1206, 1208 and/or 1210 may include microcontroller instructions, state machine configuration parameters, or some combination thereof.

In one configuration, the apparatus 1200 for wireless communication includes modules and/or circuits 1204 configured to receive a sequence of symbols from a plurality of the signal wires 1214, each symbol in the sequence of symbols being received during one of an odd transmission interval or an even transmission interval, modules and/or circuits 1206 configured to generate a first clock signal from transitions in signaling state of the plurality of signal wires 1214 occurring between each odd transmission interval and a consecutive even transmission interval, modules and/or circuits 1208 configured to generate a second clock signal from transitions in signaling state of the plurality of signal wires occurring between each even transmission interval and a consecutive odd transmission interval, and modules and/or circuits 1210 configured to capture a first set of symbols including symbols in the sequence of symbols that are received in even transmission intervals using the first clock signal, and further configured to capture a second set of symbols including symbols in the sequence of symbols that are received in odd transmission intervals using the second clock signal. In one example, the circuits illustrated in FIGS. 1-4, 6-7 and 9 provide logic that may implement the various functions performed by the processing circuit 1202.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications, comprising:
   receiving a sequence of symbols from a plurality of signal wires, wherein each symbol in the sequence of symbols is received during one of an odd transmission interval or an even transmission interval;
   generating a first clock signal from transitions in signaling state of the plurality of signal wires occurring between each odd transmission interval and a consecutive even transmission interval;
   generating a second clock signal from transitions in signaling state of the plurality of signal wires occurring between each even transmission interval and a consecutive odd transmission interval;
   using the first clock signal to capture a first set of symbols comprising symbols in the sequence of symbols that are received in even transmission intervals; and
   using the second clock signal to capture a second set of symbols comprising symbols in the sequence of symbols that are received in odd transmission intervals.

2. The method of claim 1, wherein each odd transmission interval is immediately preceded by a first even transmission interval and immediately succeeded by a second even transmission interval.

3. The method of claim 1, wherein each pair of consecutive symbols received in the sequence of symbols comprises one symbol received during in an odd transmission interval and one symbol received during an even transmission interval.

4. The method of claim 1, wherein timing of a first edge in the first clock signal is based on a first transition that occurs between a first symbol and a second symbol that is received immediately after the first symbol, and wherein timing of a first edge in the second clock signal is based on a second transition that occurs between the second symbol and a third symbol that is received immediately after the second symbol.

5. The method of claim 4, wherein timing of a second edge in the first clock signal is based on the timing of the first edge in the second clock signal, and wherein timing of a second edge in the second clock signal is based on timing of a third edge in the first clock signal, the timing of the third edge in the first clock signal being based on a third transition that occurs between the third symbol and a fourth symbol that is received immediately after the third symbol.

6. The method of claim 4, wherein generating the first clock signal comprises:
   ignoring the second transition.

7. The method of claim 4, wherein generating the second clock signal comprises:
   ignoring the first transition.

8. The method of claim 1, wherein each pair of consecutive symbols in the sequence of symbols includes two symbols that are associated with different signaling states on the plurality of signal wires.

9. The method of claim 1, wherein receiving the sequence of symbols from the plurality of signal wires comprises:
   receiving differential signals from all possible combinations of two signal wires in the plurality of signal wires, wherein each symbol in the sequence of symbols is encoded in a combination of signaling states of the differential signals.

10. The method of claim 1, wherein receiving the sequence of symbols from the plurality of signal wires comprises:
   receiving a 3-phase signal from each of three signal wires, wherein each of the three signal wires is in a different signaling state with respect to the other signal wires in each transmission interval, and wherein each symbol in the sequence of symbols is encoded in a combination of signaling states of the three signal wires.

11. An apparatus, comprising:
   means for receiving a sequence of symbols from a plurality of signal wires, wherein each symbol in the sequence of symbols is received during one of an odd transmission interval or an even transmission interval;
   means for generating a first clock signal from transitions in signaling state of the plurality of signal wires occurring between each odd transmission interval and a consecutive even transmission interval;
   means for generating a second clock signal from transitions in signaling state of the plurality of signal wires occurring between each even transmission interval and a consecutive odd transmission interval;

means for using the first clock signal to capture a first set of symbols comprising symbols in the sequence of symbols that are received in even transmission intervals; and means for using the second clock signal to capture a second set of symbols comprising symbols in the sequence of symbols that are received in odd transmission intervals.

12. The apparatus of claim 11, wherein each odd transmission interval is immediately preceded by a first even transmission interval and immediately succeeded by a second even transmission interval.

13. The apparatus of claim 11, wherein each pair of consecutive symbols received in the sequence of symbols comprises one symbol received during in an odd transmission interval and one symbol received during an even transmission interval.

14. The apparatus of claim 11, wherein timing of a first edge in the first clock signal is based on a first transition that occurs between a first symbol and a second symbol that is received immediately after the first symbol, and wherein timing of a first edge in the second clock signal is based on a second transition that occurs between the second symbol and a third symbol that is received immediately after the second symbol.

15. The apparatus of claim 14, wherein timing of a second edge in the first clock signal is based on the timing of the first edge in the second clock signal, and wherein timing of a second edge in the second clock signal is based on timing of a third edge in the first clock signal, the timing of the third edge in the first clock signal being based on a third transition that occurs between the third symbol and a fourth symbol that is received immediately after the third symbol.

16. The apparatus of claim 14, wherein the means for generating the first clock signal is adapted to ignore the second transition.

17. The apparatus of claim 14, wherein the means for generating the second clock signal is adapted to ignore the first transition.

18. The apparatus of claim 11, wherein each pair of consecutive symbols in the sequence of symbols includes two symbols that are associated with different signaling states on the plurality of signal wires.

19. The apparatus of claim 11, wherein the means for receiving the sequence of symbols from the plurality of signal wires is configured to receive differential signals from all possible combinations of two signal wires in the plurality of signal wires, wherein each symbol in the sequence of symbols is encoded in a combination of signaling states of the differential signals.

20. The apparatus of claim 11, wherein the means for receiving the sequence of symbols from the plurality of signal wires is configured to receive a 3-phase signal from each of three signal wires, wherein each of the three signal wires is in a different signaling state with respect to the other signal wires in each transmission interval, and wherein each symbol in the sequence of symbols is encoded in a combination of signaling states of the three signal wires.

21. A receiver, comprising:
a plurality of line interface circuits configured to receive signals from a plurality of signal wires; and
a clock and data recovery circuit configured to:
receive a sequence of symbols from the plurality of signal wires, wherein each symbol in the sequence of symbols is received during one of an odd transmission interval or an even transmission interval;

generate a first clock signal from transitions in signaling state of the plurality of signal wires occurring between each odd transmission interval and a consecutive even transmission interval;

generate a second clock signal from transitions in signaling state of the plurality of signal wires occurring between each even transmission interval and a consecutive odd transmission interval;

use the first clock signal to capture a first set of symbols comprising symbols in the sequence of symbols that are received in even transmission intervals; and use the second clock signal to capture a second set of symbols comprising symbols in the sequence of symbols that are received in odd transmission intervals.

22. The receiver of claim 21, wherein timing of a first edge in the first clock signal is based on a first transition that occurs between a first symbol and a second symbol that is received immediately after the first symbol, and wherein timing of a first edge in the second clock signal is based on a second transition that occurs between the second symbol and a third symbol that is received immediately after the second symbol.

23. The receiver of claim 22, wherein timing of a second edge in the first clock signal is based on the timing of the first edge in the second clock signal, and wherein timing of a second edge in the second clock signal is based on timing of a third edge in the first clock signal, the timing of the third edge in the first clock signal being based on a third transition that occurs between the third symbol and a fourth symbol that is received immediately after the third symbol.

24. The receiver of claim 22, wherein the first transition is ignored by circuitry that generates the second clock signal, and wherein the second transition is ignored by circuitry that generates the first clock signal.

25. The receiver of claim 21, wherein each pair of consecutive symbols in the sequence of symbols includes two symbols that are associated with different signaling states on the plurality of signal wires.

26. A non-transitory processor-readable storage medium having one or more instructions which, when executed by at least one processing circuit, cause the at least one processing circuit to:
receive a sequence of symbols from a plurality of signal wires, wherein each symbol in the sequence of symbols is received during one of an odd transmission interval or an even transmission interval;

generate a first clock signal from transitions in signaling state of the plurality of signal wires occurring between each odd transmission interval and a consecutive even transmission interval;

generate a second clock signal from transitions in signaling state of the plurality of signal wires occurring between each even transmission interval and a consecutive odd transmission interval;

use the first clock signal to capture a first set of symbols comprising symbols in the sequence of symbols that are received in even transmission intervals; and use the second clock signal to capture a second set of symbols comprising symbols in the sequence of symbols that are received in odd transmission intervals.

27. The non-transitory processor-readable storage medium of claim 26, wherein timing of a first edge in the first clock signal is based on a first transition that occurs between a first symbol and a second symbol that is received immediately after the first symbol, and wherein timing of a first edge in the second clock signal is based on a second transition that occurs between the second symbol and a third symbol that is received immediately after the second symbol.

28. The non-transitory processor-readable storage medium of claim 27, wherein timing of a second edge in the first clock signal is based on the timing of the first edge in the second clock signal, and wherein timing of a second edge in the second clock signal is based on timing of a third edge in the first clock signal, the timing of the third edge in the first clock signal being based on a third transition that occurs between the third symbol and a fourth symbol that is received immediately after the third symbol.

29. The non-transitory processor-readable storage medium of claim 27, wherein the one or more instructions cause the at least one processing circuit to:
ignore the first transition when generating the second clock signal.

30. The non-transitory processor-readable storage medium of claim 27, wherein the one or more instructions cause the at least one processing circuit to:
ignore the second transition when generating the first clock signal.

31. The method of claim 1, further wherein each symbol in the sequence of symbols defines a signaling state of the plurality of signal wires for a corresponding transmission interval, and data is encoded in a difference in value between symbols in each pair of consecutive symbols in the sequence of symbols.

* * * * *